May 24, 1932. P. BLUM 1,859,762
DOUGH DIVIDING MACHINE
Filed Sept. 8, 1931 2 Sheets-Sheet 2
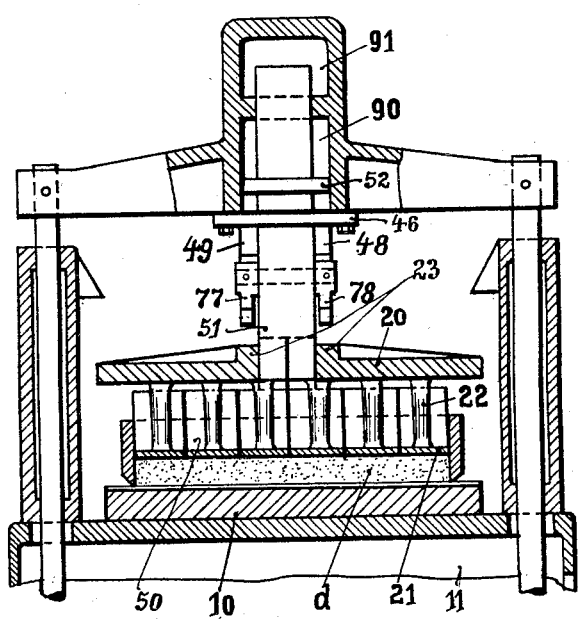
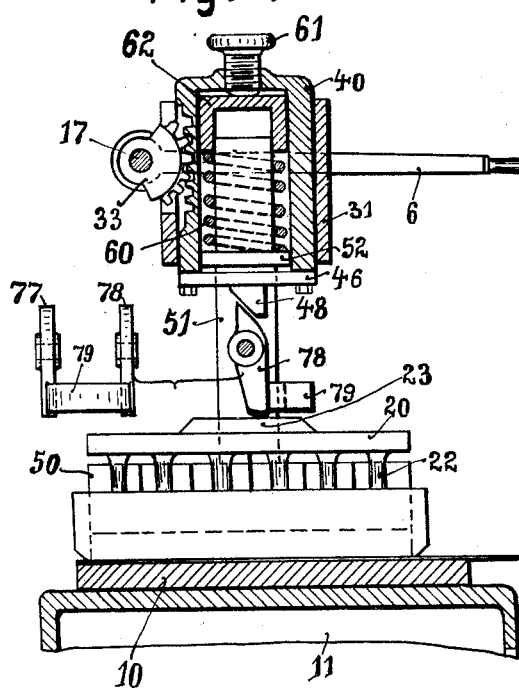
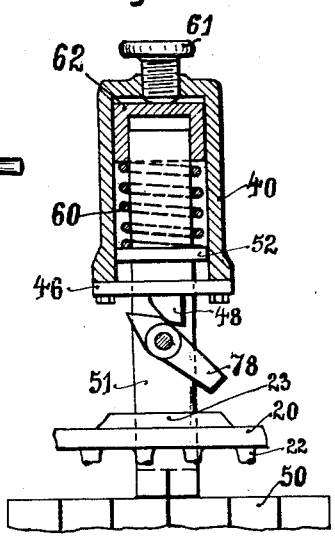
Inventor:
Peter Blum
by Karl Viertel
Att'y Patented May 24, 1932

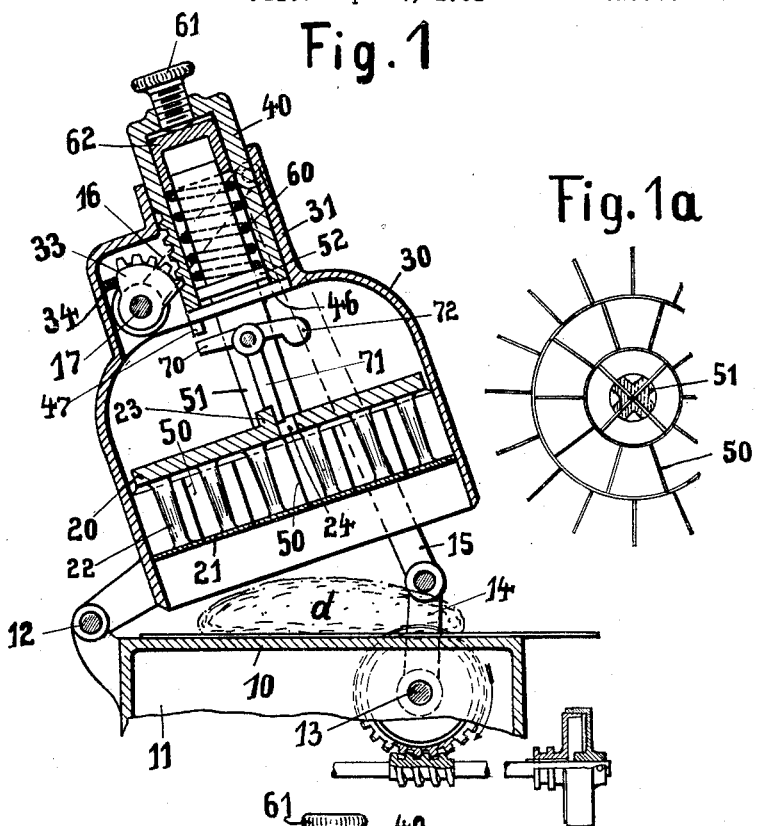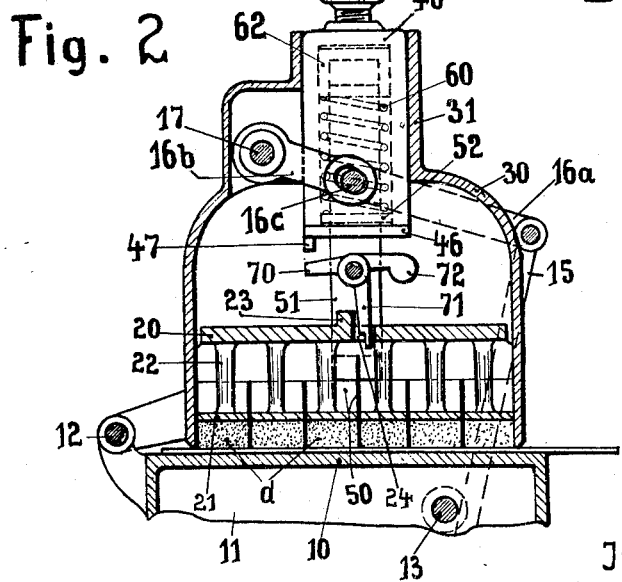

1,859,762

UNITED STATES PATENT OFFICE

PETER BLUM, OF HALLE-ON-THE-SAALE, GERMANY

DOUGH DIVIDING MACHINE

Application filed September 8, 1931, Serial No. 561,563, and in Austria September 8, 1930.

My invention relates to dough dividing machines of the type in which batches of dough of equal—predetermined—weight, after having been successively placed on the platform of the machine are first spread out thereon by a pressing plate so as to be transformed into a disc or cake of uniform thickness throughout and are thereupon divided by a cutting tool of special design—the system of cutting blades of which resembling somewhat a cobweb (see Fig. 1a) in their configuration—into a relatively large number of small pieces of dough of equal weight from which rolls, small loaves of bread, crackers and like alimentary articles of relatively small size are made.

The whole dividing process thus comprises two steps: the spreading and pressing operation and the cutting i. e. the dividing operation proper.

With dividing machines of this type the cutting tool is usually fixed to and actuated by a shaft by which it is moved up and down, whereas the spreading and pressing plate is only temporarily coupled with and engaged by the actuating shaft of the cutting tool viz. during the spreading and pressing operation. This means that the pressing plate must be disengaged at the proper time from the actuating shaft of the cutting tool in order to allow the latter to be lowered into the spread out dough.

As a matter of fact known to practitioners the said disengagement of the pressing plate at the proper time viz. when the dough is fully spread out and under appropriate pressure calls for constant attention and good judgment on the part of the operator,—more so in cases when doughs of different plasticity, maturity and composition are under treatment, or when articles of different weight are to be made in succession from spread out batches of dough of different thickness.

Also with motor driven machines of which the pressing plate is automatically disengaged by levers, cams, etc., the proper adjustment of those parts accomplishing the disengagement of the pressing plate requires considerable skill not to be found with all operators, and at all events causes considerable delay whenever different articles are to be made.

The principal object of my invention is to overcome the said drawbacks by providing an improved dough dividing machine of the type set forth which is of simple design and which can be operated and kept in good working order even by unskilled attendants.

Other objects of the invention will become apparent hereinafter. The nature and scope of my invention are briefly outlined in the appended claims and will be more fully understood from the following specification taken together with the accompanying drawings in which:

Fig. 1 is a fragmentary cross section taken vertically through the principal parts of a dough dividing machine in opened state, shown by way of an example, Fig. 1a is a plan showing a cutting member as generally used in dough dividing machines of the type concerned, Fig. 2 shows a structurally modified machine in closed state and with the cutting member in its lowermost position, Figs. 3 and 4 are side elevations, partly in section, of machines having structurally modified mechanism for automatically disengaging the pressing plate, Fig. 5 is a front elevation, partly in section, of another structurally modified dough dividing machine of the type concerned, showing the same at the time when the spreading and pressing plate has become disengaged, the cutting member continuing its downward stroke alone.

Referring to the embodiment of my invention shown in Fig. 1 the principal parts of my improved dough dividing machine comprise a platform 10 whereon the batch of dough $d$ is placed and on which the latter is evenly spread out, so as to form a disc or cake of uniform thickness, by a pressing plate 20 cooperating with a hood 30.

The latter is pivotally attached at 12 to the frame 11 of the machine and is capable of being swung up and down by means of a slowly rotating crank shaft 13, 14, a connecting rod 15, and a lever 16 attached to a shaft 17.

Within the upper part 31 of the hood 30 a sleeve 40 is slidably arranged so as to be capable of being moved up and down by a segmental gear wheel or quadrant 33, keyed to shaft 17, and gearing with a toothed portion of sleeve 40. A stop 34 within the hood 30 controls the upward and rearward movement of the quadrant 33, causing the hood 30 to be lifted upwards by lever 16 and connecting rod 15 when the gear wheel 33 bears against said stop.

Sleeve 40 serves for operating the cutting member 50, shown more in detail in Fig. 1a. Within the sleeve 40 a resilient member or buffing mechanism in the form of a helical spring 60 is mounted, surrounding the upper end of shaft 51 to which the cutting member 50 is attached, and bearing against a collar 52 of shaft 51. A set screw 61 allows to adjust the pressure of the spring, a cap 62 being provided intermediate the screw and the spring which snugly fits in the sleeve 40 surrounding the upper end of shaft 51 so as to guide the latter. Other guiding means ensuring the correct movement of shaft 51 relatively to the hood 30 comprise the aforesaid collar 52 which also snugly fits in the sleeve 40 and a lid 46 having a central passage by which the sleeve 40 is closed at the bottom.

Summarizing the essential points of the foregoing description: The shaft 51 carrying the cutting member 50 is resiliently held by the sleeve 40 so as to follow the movements of the latter but also to be able of moving upwards relatively to the sleeve as soon as any reactive force imparted to the said shaft 51 exceeds the pressure of the spring 60.

As seen best in Figs. 3 and 5 the pressing plate 20 loosely fits around shaft 51 of the cutting member 50, being carried by the latter, and would follow its movements simply by gravitational force.

The bottom pieces 21 of the pressing plate 20 are connected with the latter by legs 22 and snugly fit within the open spaces left between the blades of the cutting member 50.

It should also be noted, that the lower edges of the cutting blades 50 are flush with the lower faces of the bottom pieces 21 when the pressing plate is locked with the shaft 51, as seen in Figs. 1 and 5.

According to my invention an automatic locking mechanism is provided for temporarily interconnecting the pressing plate 20 and the cutting member 50, viz. during the spreading operation referred to above, and for disengaging the pressing plate 20 during the dividing operation viz. so as to remain in its position—however continuing to keep the dough under pressure—while the cutting member 50 proceeds on its downward stroke dividing the spread out dough into pieces.

The said automatic locking mechanism comprises a bell crank lever 70, 71 pivotally attached to shaft 51 and being provided with a counterweight 72, the upper arm 70 of lever cooperating with a stop 47 projecting from lid 46, while the lower arm 71 cooperates with a stop 23, provided on plate 20, and with a passage 24 within the latter, into which the arm 71 will project after the pressing plate 20 has become disengaged (Fig. 2).

The said disengagement occurs as soon as the dough $d$ has been fully spread out on the platform 10 by the pressing plate 20 and its bottom pieces 21 respectively. By the reaction from the spread-out dough on the pressing plate 20 and in turn on shaft 51 the latter, overcoming the pressure of spring 60, will move upwardly relatively to sleeve 60, thus bringing arm 70 into contact with the stop 41, and releasing the pressing plate 20, as will be understood from Fig. 2.

Various changes and modifications may be made in the construction and design of dough dividing machines having the improvements described above, without substantially deviating from the spirit and the leading ideas of my invention, and without sacrificing any advantages obtained thereby.

A few structural modifications which may suggest themselves to experts in this field are shown in Figs. 2–5.

Instead of a bell crank lever 70, 71 a different locking mechanism comprising a pair of levers 77, 78 may be used which cooperate with wedge shaped stops 48, 49 in the manner shown in Figs. 3–5.

In the embodiment of the invention shown in Fig. 4 the said levers 77, 78 are interconnected by an arc shaped counterweight 79.

The machines shown in Figs. 1, 2 and 5 are of the motor driven type, while those shown in Figs. 3 and 4 are to be operated by a hand lever 6.

Instead of a toothed gearing a pair of levers 16a, 16b engaging pins 16c—shown in Fig. 2—may be employed to advantage for operating the sleeve 40a of the machine shown in Fig. 2.

Fig. 5 shows a buffing mechanism, operated by a fluid such as compressed air, which may be used instead of a spring, viz. comprising cylinders 90, 91 which cooperate with the upper end of shaft 51 and its collar 52, the latter acting as plungers, and which are connected with a source of compressed air by a system of pipes not shown.

By changing the pressure of the compressed fluid within the cylinders 90, 91 for instance by means of a small hand operated pump the responsiveness of the automatic mechanism for unlocking the pressure plate 20 can be easily and quickly adapted to varying conditions of work explained above.

What I claim is:

1. In a dough dividing machine of the type set forth, the combination with a platform supporting the dough, of a pressing plate for spreading out the dough on said platform, a cutting member for dividing the spread out dough into pieces, a reciprocating shaft to which said cutting member is attached, an actuating member with which the said shaft is resiliently connected and locking means cooperatively interengaging the said pressing plate and the cutting member and being responsive to retrogressive movements of the latter relatively to the progressing actuating member, so as to automatically disengage the pressing plate from the cutting member when the dough has been fully spread out and is under pressure 2. A dough dividing machine of the type set forth and having the features outlined in claim 1, in which the shaft carrying the cutting member is resiliently connected with a slidably arranged sleeve by a spring, means being provided for adjusting the tension of said spring.

3. A dough dividing machine of the type set forth and having the features outlined in claim 1, in which the shaft carrying the cutting member is resiliently connected with its actuating member by a helical buffer spring, means being provided for adjusting the tension of said spring, said means comprising a set screw and a cap intermediate said screw and the buffer spring, said cap surrounding and guiding the upper end of the shaft carrying the cutting member.

4. A dough dividing machine of the type set forth and having the features outlined in claim 1, in which the shaft carrying the cutting member is resiliently connected with its actuating member by means of a buffing apparatus operated by a gaseous medium and comprising a cylinder and a plunger cooperating therewith.

5. A dough dividing machine of the type set forth and having the features outlined in claim 1, in which the means for automatically disengaging the pressing plate from the cutting member comprise a pivoted locking lever attached to the shaft carrying the cutting member and being cooperatively associated with the actuating member of the said shaft, means being provided for automatically restoring said lever into its active position.

6. A dough dividing machine of the type set forth and having the features outlined in claim 1, in which the means for automatically disengaging the pressing plate from the cutting member comprise a bell crank lever, pivotally attached to the shaft carrying the cutting member and being cooperatively associated with the actuating member of the said shaft, a counterweight, being attached to said lever for automatically restoring it into its active position.

In testimony whereof I have signed my name to this specification.

PETER BLUM.